United States Patent Office 2,716,071
Patented Aug. 23, 1955

2,716,071

CELLULOSE ORGANIC ACID ESTER PLASTICS CONTAINING MONO - TERTIARY - BUTYL HYDROQUINONE MONO-SALICYLATE

Lester W. A. Meyer and Margaret H. Broyles, Kingsport, Tenn., assignors to Eastman Kodak Company, Rochester, N. Y., a corporation of New Jersey No Drawing. Application November 24, 1953,
Serial No. 394,201

3 Claims. (Cl. 106—182)

This invention relates to cellulose organic acid ester plastics, and more particularly to the stabilization of such plastics.

As is well known in the art, plastics having excellent properties for a great many purposes can be prepared from cellulose organic acid esters, such for example, as cellulose acetate, cellulose propionate, cellulose butyrate, cellulose acetate-propionate and cellulose acetate-butyrate, with suitable plasticizers. Many examples of suitable plasticizers are known in the art. The choice of plasticizers forms no part of our invention.

However, cellulose organic acid ester plastics have not been entirely suitable for use in places where they are exposed to a considerable amount of ultra-violet light: e. g., out of doors. After one or two months of outdoor exposure in a sunny climate, the plastic bleached and became increasingly brittle until, at the end of from three to six months, depending on the severity of the climate, crazing occurred. The rapid deterioration of appearance was accompanied by an equally rapid breakdown in physical properties, such as strength.

Some compounds whose addition to the plastic composition inhibited physical breakdown of the plastic, caused intense discoloration when the plastic was exposed for any length of time to sunlight or other source of ultra-violet light.

We have found that the addition of a small proportion of mono-tertiary-butyl hydroquinone monosalicylate

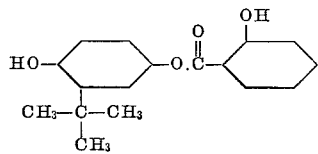

to a cellulose organic acid ester plastic composition strongly inhibits breakdown of the resulting plastic by exposure to ultraviolet light. We prefer to use approximately 0.5% to 1% of mono-tertiary-butyl hydroquinone mono-salicylate, based on the weight of cellulose organic acid ester. Higher amounts give only slightly greater weathering resistance, and may change the physical properties of the plastic. As cellulose organic acid esters, we have employed those mentioned above, in which the acyl groups contain from 2 to 4 carbon atoms. Cellulose acetate plastics are not as effective for outdoor uses as are the mixed and higher esters, that is, those containing an acyl group higher than acetyl, because the usual cellulose acetate plasticizer retention is rather poor under outdoor exposure.

Mono-tertiary-butyl hydroquinone mono-salicylate was prepared as follows.

In a one-liter, 3-necked flask fitted with an automatic decanting reflux condenser, thermometer, and an agitator were placed 183 grams (1 mole+10% excess) of mono-tertiary-butyl hydroquinone, 138 grams (1 mole) of salicylic acid and 4 drops of sulfuric acid. The mixture was fused for six hours at 190° C., after which the product was cooled to room temperature. A solution of the solid reaction mixture was effected in a mixture of 50:50 methanol-isopropyl ether in order to neutralize the excess acid with a 20 per cent sodium carbonate solution. The neutralized product was washed twice with water, and the low boilers were removed by heating the mixture on the steam cone under steam jet vacuum. The residue was distilled under vacuum collecting the following fractions:

1. 45 grams @ 103–154° C. @ 0.15 mm.
2. 34 grams @ 154–161° C. @ 0.06 mm.

The fractions were analyzed as follows:

|  | F #1 | F #2 |
|---|---|---|
| Percent Acid | 0.49 | 0.49 |
| Melting Point (° C.) | 67–78 | 80 |
| Percent Free OH | 15.34 | 11.26 |
| Theoretical percent Free OH | 11.9 | 11.9 |
| Theoretical percent Carbon | 71.32 | 71.32 |
| Calculated percent Carbon | 68.17 | 67.63 |
| Theoretical percent Hydrogen | 6.29 | 6.29 |
| Calculated percent Hydrogen | 5.18 | 5.00 |

In testing our cellulose organic acid ester plastics containing mono - tertiary - butyl hydroquinone mono-salicylate, we have tested sheets of 0.050 inch thickness by the Kline test, designated as A. S. T. M. D795–49. The method consists of the following test cycle:

18 hours under General Electric S–1 sunlamp (6 inches below lamp)
2 hours in fog chamber
2 hours under S–1 sunlamp
2 hours in fog chamber This cycle was repeated until the first sign of surface failure of the samples of plastic, as shown by dulling, chalking, checking, crazing, or discoloration. The temperature inside the accelerated weathering machine is maintained at 55° to 60° C.

It has been found by the National Bureau of Standards and verified by us, that roughly 200 hours' sunlamp exposure by this test is equivalent to one year's outdoor exposure in Washington, D. C. Outdoor exposure farther south or at high altitude is more severe, however.

The following table shows the values obtained by weathering similar samples of plasticized cellulose acetate-butyrate plastics of the same compositions, containing (a) no ultraviolet inhibitor, (b) 1%, based on the cellulose ester, of the well-known ultraviolet inhibitor, phenyl salicylate, and (c) 1%, based on the cellulose ester, of mono-teritary-butyl hydroquinone mono-salicylate.

| Inhibitor | Hours to Failure | Color of Plastic | |
|---|---|---|---|
|  |  | Start of Test | End of Test |
| None | 200–250 |  |  |
| Phenyl salicylate | 1,000 | 5 | 6 |
| Mono-tert.-butyl hydroquinone mono-salicylate | 1,332 | 5 | 15 |

The numbers in the "Color of Plastic" column indicate the relative intensity of coloration of the samples.

At the end of 1,332 hours, the sample containing the mono-tertiary-butyl hydroquinone monosalicylate showed very slight checking and crazing of the surface.

Mono-tertiary-butyl hydroquinone monosalicylate is advantageously introduced into a cellulose organic acid ester plastic at the time the cellulose ester is compounded with the plasticizer. This compounding may be accomplished by any of the known methods, including the method of working on hot rolls described in Conklin's U. S. Patent 2,155,303. Mono-tertiary-butyl hydroquinone monosalicylate causes no substantial discoloration of the plastic, even when the hot-rolling method of compounding is employed, and no substantial discoloration takes place during accelerated testing.

By way of application, we give the following example of making up cellulose organic acid ester plastics containing monotertiary-butyl hydroquinone monosalicylate. It will be understood that this illustration does not constitute a limitation of our invention, which is defined in the appended claims.

*Example.*—100 parts of cellulose acetate-butyrate containing approximately 12% acetyl and 37% butyryl is intimately mixed in a sigma-blade mixer with 13 parts of dibutyl sebacate and 1 part of mono-tertiary-butyl hydroquinone monosalicylate. The mixture is worked on hot rolls by the method described in the Conklin Patent 2,155,303. The resulting plastic can then be granulated and be ready for any molding or extrusion operation.

Any of the known plasticizers for cellulose organic acid esters, such, for example, as dibutyl phthalate, dibutyl sebacate, methoxyethyl stearate, tricresyl phosphate, butoxyethyl phthalate, diamyl phthalate, ethyl p-toluene sulfonamide, etc. may be used. In the case of the softer cellulose esters, such as cellulose acetate-butyrate, plastics may even be formed without the use of any plasticizer.

What we claim as our inventoin and desire to be secured by Letters Patent of the United States is:

1. A cellulose organic acid ester plastic comprising a cellulose organic acid ester selected from the group consisting of cellulose acetate, cellulose propionate, cellulose butyrate, cellulose acetate-propionate and cellulose acetate-butyrate, a plasticizer therefor, and, as an agent for inhibiting deterioration of the plastic by ultra-violet light, approximately 0.5%–1%, based on the weight of the cellulose ester, of 3-mono-tertiary-butyl hydroquinone mono-salicylate.

2. A cellulose acetate-butyrate plastic comprising cellulose acetate-butyrate, a plasticizer therefor, and, as an agent for inhibiting deterioration of the plastic by ultraviolet light, approximately 0.5%–1%, based on the weight of the cellulose acetate-butyrate, of 3-mono-tertiary-butyl hydroquinone monosalicylate.

3. A cellulose acetate-butyrate plastic comprising cellulose acetate-butyrate and, as an agent for inhibiting deterioration of the plastic by ultraviolet light, approximately 0.5%–1%, based on the weight of the cellulose acetate-butyrate, of 3-mono-tertiary-butyl hydroquinone mono-salicylate.

References Cited in the file of this patent

UNITED STATES PATENTS 2,432,517     Dreyfus _____ Dec. 16, 1947